Aug. 15, 1967
T. PARISI ET AL
3,335,443
ULTRASONIC BRUSH
Filed Dec. 15, 1965
2 Sheets-Sheet 1
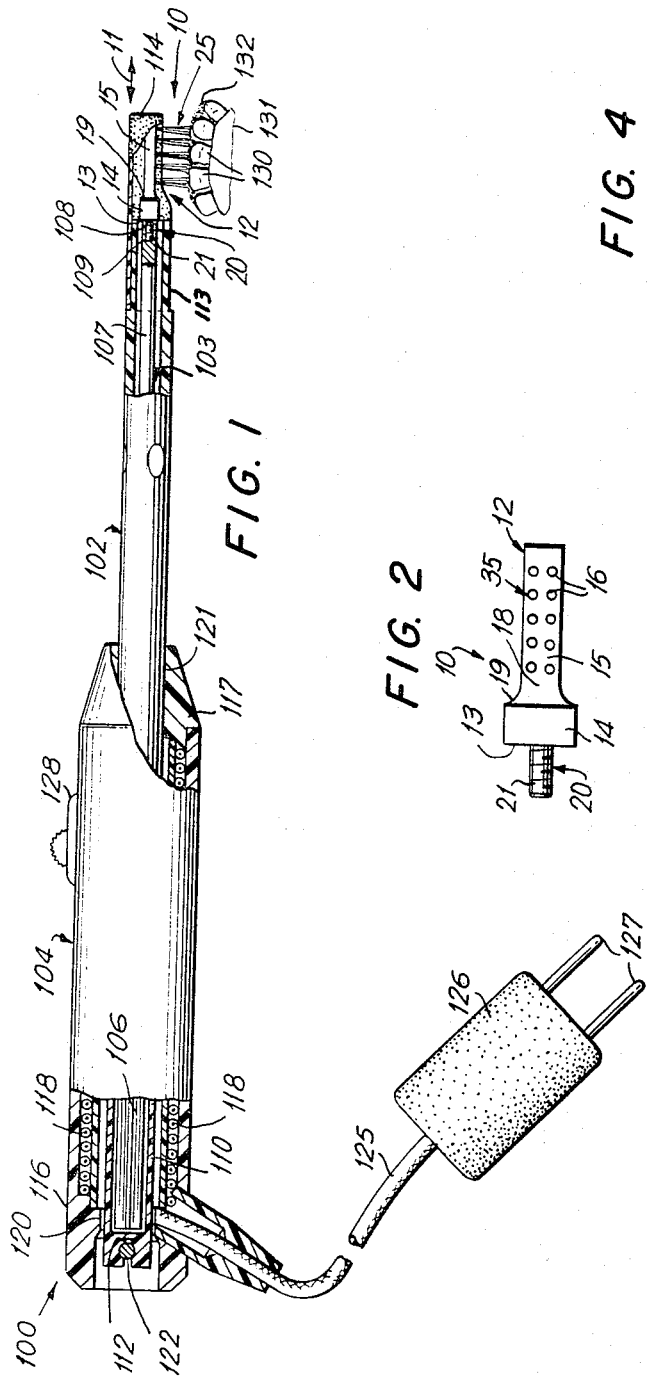
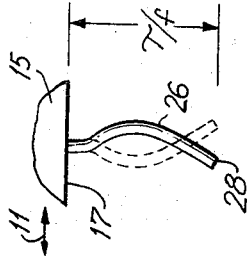
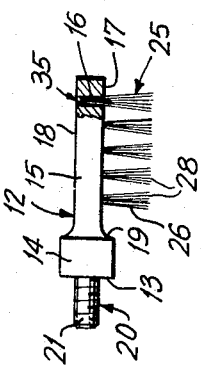
INVENTORS.
TULIO PARISI
ANTON BANKO
Leonard W. Suroff
ATTORNEY

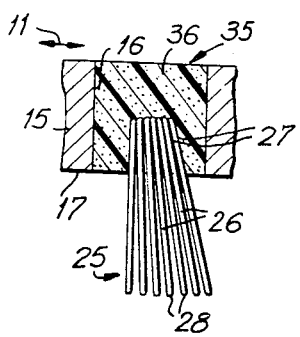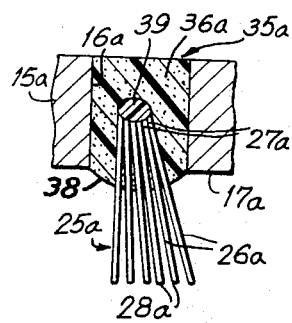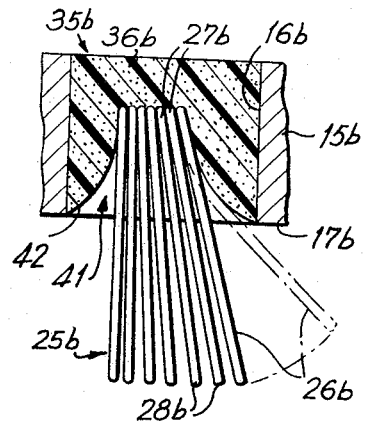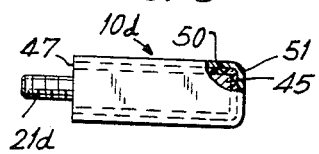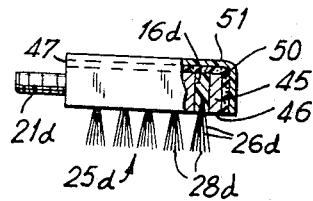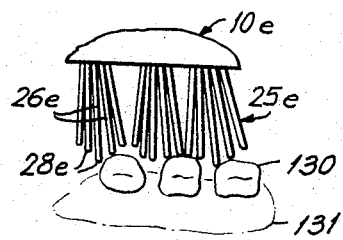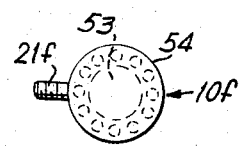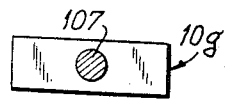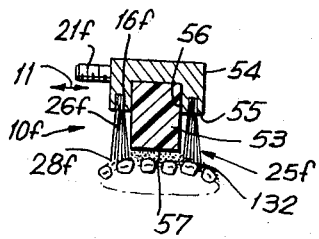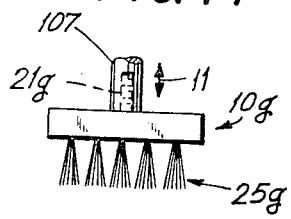

United States Patent Office 3,335,443
Patented Aug. 15, 1967

3,335,443
ULTRASONIC BRUSH
Tulio Parisi, Selden, and Anton Banko, Brooklyn, N.Y., assignors to Cavitron Ultrasonics Inc., Long Island City, N.Y., a corporation of New York
Filed Dec. 15, 1965, Ser. No. 524,957
21 Claims. (Cl. 15—22)

This invention relates to surface cleaners and more particularly to a brush capable of being vibrated at high sonic and ultrasonic frequencies for loosening and removing foreign matter from a surface.

In a co-pending patent application of Balamuth and Kuris, Ser. No. 513,991, filed Dec. 15, 1965, for Methods and Apparatus for Ultrasonic Cleaning of Teeth, and assigned to the assignee of the present invention, an ultrasonic toothbrush is shown having a brush, which may take several different forms but in general is similar to conventional toothbrush heads in appearance, having a base portion onto which are affixed a plurality of bristles or bristlelike elements which are vibrated at a high sonic or ultrasonic rate and manually moved over tooth and gingival surfaces under relatively light pressure. The brush is rigidly affixed, such as by screw threads, to one end of a driving member in the form of a narrow elongated vibrator which is of a size and shape to be conveniently held in the hand and serves to drive the brush at a high frequency so as to cause the bristles to vibrate. The vibrator is powered by a suitable source of alternating electrical signals supplied by an electronic generator. The bristles are lightly pressed against the tooth or gingival surfaces in the human mouth and a suspension of a fluid, such as water specifically for the purpose, or the natural fluids present in the mouth and in the presence of the usual dentifrices such as toothpaste and toothpowder, is flowed around the brush bristles. At the frequencies employed, generally in the range of approximately 15,000 to 40,000 cycles per second ordinarily no movement of the brush base and bristles is visible to the naked eye and this is particularly true because the amplitude of movement of the brush is necessarily small, certainly not in excess of .05 inch, and ordinarily very much less. Even though no movement of the brush base and bristles is visible, it will be noted that the bristles undergo vibrations of approximately 1,000,000 cycles per minute and in a relatively short period of time the bristles will fatigue and fracture in their area of juncture with the brush base unless the brush is properly designed in accordance with the present invention.

It was first believed that commercially available brushes could be coupled to a high frequency driving member and withstand the millions of cycles of stress placed upon it per hour of use. But it was soon found that this could not be accomplished with existing brushes for after a limited period of use they generally overheated and fatigued, with the individual bristle elements fracturing in the general vicinity of their juncture with the base of the brush. Additionally, commercially available brushes were not designed to properly transmit the high frequency vibrations under loaded conditions when the free ends of the bristle clusters were in contact with a work surface and used either in a substantially dry condition or a wet condition to produce cavitational action at the work surface.

It is with the above problems in mind, that the present brushes have been evolved for use in combination with high frequency driving means that may be in either the sonic or ultrasonic frequency range but for purposes of the present invention the word "ultrasonic" will be used to denote vibrations in the range of approximately 5,000 to 100,000 cycles per second. Although the principles of the present invention are broadly applicable to ultrasonically vibrated brushes, the brushes of the present invention are particularly adapted for use in conjunction with ultrasonic dental cleaning implements and hence they have been so illustrated and will be so described.

It is accordingly a primary object of this invention to provide a readily replaceable novel brush which shall be particularly adapted to be driven in the ultrasonic frequency range for regular personal hygienic care to remove material from the teeth and gum line areas around the teeth.

Another object of the present invention is to provide a novel brush which is coupled to an ultrasonic vibratory hand-held dental instrument and capable of withstanding use for prolonged periods of time without the bristle elements of the brush fatiguing.

Yet another object of the present invention is to provide an ultrasonic brush having a base with a plurality of bristle clusters secured thereto and which bristle clusters vibrate at substantially the same frequency of vibration as the base for comparatively long periods of time without fatiguing.

Still another object of the present invention is to provide a novel brush for use with a dental cleaning implement that is acoustically insulated to permit the insertion of the brush in the oral cavity without the transmission of any ultrasonic vibrations thereto.

A further object of the present invention is to provide an ultrasonic brush having a base with a plurality of bristle elements extending therefrom which are designed to flexurally vibrate at their free end.

Still another object of the present invention is to provide an ultrasonic brush in which the bristles extending from the base project outwardly and are of varied length to randomly engage the work surface.

Yet a further object of the present invention is to provide a brush wherein the bristles are joined to the base in a manner to permit a proper coupling therebetween for the transmission of high frequency mechanical vibrations from the brush base to the bristle elements extending therefrom.

Still another object is to provide a brush wherein the interrelated dimensions of the bristle elements to the apertures in the brush base for receiving the bristles are properly dimensioned to prolong the life of the bristles.

These and other objects of the invention which will become hereafter apparent are achieved by a readily replaceable brush having a base portion adapted to be connected to an ultrasonically vibrated driving member or ultrasonic motor that may be hand-held and the brush base is fixed to said driving member substantially in the region of high frequency vibration, for example, a loop of longitudinal, torsional, or radial vibration. In this manner the brush base is vibrated at a frequency and amplitude which substantially corresponds to the frequency and amplitude of vibration of the driving member to which said brush is secured. The means for coupling the bristles or other cleaning elements to the brush base, as well as the length, diameter and composition of the bristles all play an interrelated role on the fatigue life of the brush.

In the illustrated preferred embodiments of the invention, as will be hereafter more fully described, coupling means are provided to firmly secure the individual ends of the bristle clusters to the base of the brush whereby vibratory motion is imparted to the bristle clusters. To receive the bristle clusters a plurality of apertures which extend substantially perpendicular to the face surface of the base are provided for respectively receiving an end of each of said bristle clusters. A bonding agent in the form of an epoxy cement couples the base to the bristle clusters so that a proper transmission of the high frequency mechanical vibrations induced in the base is transmitted to the individual bristles.

A feature of the invention resides in the arrangement of the bonding agent within the apertures and in surrounding relation to the terminal end of the bristle clusters so that a maximum amount of energy is transmitted with a minimal of loss in the form of heat to the bristles. It has been found that maximum bristle life can generally be obtained by forming the bonding agent in a manner wherein a recessed area between the bristle cluster and aperture exists. The recessed area is provided with gradually tapering upwardly formed surface which merges with the face of the base from which the bristles extend. It is believed that the curved sloping form of the bonding agent, generally having a given radius, tends to control the movement of the bristle when it is in contact with a work surface whereby the stress at the juncture of base and bristle cluster is maintained at a minimum. Thus, the form of the bonding agent acts to limit the movement of the bristle at its free end, thereby maintaining the juncture of bristle cluster and bonding agent within a defined stress limit to thereby extend the life of the bristle cluster.

Another feature of the invention resides in the provision of means for acoustically insulating the base of the brush when used as a part of a toothbrush or other brushing implement in which the mechanical vibrations of the brush base would cause deleterious effects upon the user or his property. This acoustically insulating layer may be of closed cell rubber or other vibratory absorbing material and is of importance in a toothbrush for it minimizes any audible sounds that are produced at or in the vicinity of the brush and would normally be transmitted therethrough. The layer of acoustically insulating material may be coated with a smooth textured material which may be of a variety of colors and generally of a thermoplastic material for identification purposes as well as additional insulation. The outer layer is applied also for prophylaxis purposes since it is easily cleansable.

Still another feature of the present invention is the arrangement and interrelationship of individual bristle diameters and lengths to obtain maximum cleaning efficiency. For example, it has been found that a good bristle cluster may be made of bristles in the range of approximately .006 to .015 inch in diameter and in the form of a cluster bonded within an aperture having a cross-sectional area substantially larger than the cluster diameter at its terminal end wherein the bonding agent is of hard epoxy type and forms a depressed surface around the bristle cluster below the face surface of the aperture in the base of the brush.

The specific details of preferred embodiments of the invention, and their mode of functioning will be particularly pointed out in clear, concise and exact terms in conjunction with the accompanying drawings wherein:

FIG. 1 is an assembled view, in partial cross-section, of an ultrasonic brush according to the present invention which is coupled to a dental cleaning implement;

FIG. 2 is an enlarged top plan view of the brush in FIG. 1 of the present invention;

FIG. 3 is a side view of the brush shown in FIG. 2, partially in section;

FIG. 4 is an enlarged schematic representation of the vibration pattern of a single bristle element, to help illustrate the present invention;

FIG. 5 is an enlarged sectional view corresponding to a portion of FIG. 3 illustrating the position of a single bristle cluster within the base of the brush with coupling means for securing it thereto;

FIGS. 6 and 7 are views similar to that of FIG. 5 but illustrating the manner in which the coupling means in the form of a bonding agent may vary in configuration in accordance with this invention;

FIGS. 8 and 9 are views similar to FIGS. 2 and 3, respectively, illustrating an acoustically insulated brush in accordance with the invention;

FIG. 10 is an enlarged fragmentary view of a brush, and illustrating a modified bristle cluster having individual bristle elements of various lengths;

FIGS. 11 and 12 are views similar to FIGS. 2 and 3, respectively, but in which the bristle clusters are combined with a stimudent to increase the cavitational action; and FIGS. 13 and 14 are views similar to FIGS. 2 and 3, respectively, but in which the vibratory energy is introduced in a plane substantially parallel to the direction of the bristle elements. Similar reference characters refer to similar parts throughout the several views of the drawings and specification.

Turning now to FIGS. 1–3, which disclose one embodiment of the invention, the brush designated generally at 10 includes a base portion 12 capable of supporting ultrasonic vibrations with securing means 20 to connect the brush to the dental cleaning implement 100 and a plurality of individual bristle clusters 25 that they may be positioned perpendicular to the general direction of vibration or they may slope slightly forward with respect thereto, the bristle clusters 25 are individually joined as by coupling means 35 (FIG. 3) to the base 12. The brush 10 is positioned against the teeth 130 in the usual manner during the brushing operation. A layer of fluid 132 which may in the form of a dentifrice is provided on the gum surface 131. That is, the brush is inserted in the mouth and positioned adjacent to the teeth surface with a relatively light pressure such that at any given time, several of the bristle cluster 25 are in contact with the teeth surface. While the cleaning implement 100 is being manually moved over the teeth surface, the brush 10 is vibrated at an ultrasonic rate in a longitudinal direction as indicated by the two-headed arrow 11 in FIG. 1. In accordance with the present invention the bristle clusters 25 carried in the brush 10 are vibrated as they pass over the teeth surface and across the interproximal areas, the free ends thereof are vibrating at an ultrasonic rate to obtain improved cleaning results.

The tooth cleaning implement 100 which is described in greater detail in the above referred to co-pending patent application, comprises two basic elements, a brush insert 102, and a handle element 104 for receiving the insert 102. The brush insert 102 as seen in FIG. 1 is shown partially in cross-section and comprises a driving member 103 formed of an elongated magnetostrictive element 106 and a connecting body 107 rigidly affixed to one end of the magnetostrictive element 106, such as by welding. The magnetostrictive element 106 is comprised of a magnetostrictive material which will be set into vibration by a suitably oriented magnetic field supplied from a generator (not shown).

In view of the relative dimensions of the magnetostrictive portion 106, it will be seen that upon insertion in a suitably oriented magnetic field, a significant elongation of the driving member will occur. Consequently, upon application thereto of a magnetic field whose magnitude varies, the length of the driving member 103 will similarly vary. In accordance with known principles, the magnetostrictive stack 106 is made to be a length to an integral number of half-wavelengths in the material at the driving frequency. In this manner, maximum conversion of energy from the magnetic field to mechanical vibration is achieved. Other forms of electrical to mechanical transducers, e.g., piezoelectric, ferrites, may also be employed in accordance with the present invention.

The connecting member 107 may be formed of any suitable material capable of supporting vibrations and the brush 10 is rigidly affixed to the forward end 108 of the connecting member by securing means 20 which may consist of a threaded fastener 21 extending from the rear end 13 of the brush base 12 and a complementary thread recess 109 in the connecting member 107 to properly couple the vibratory motion at the forward end 108 of the driving member 103 unimpeded to the brush 10 and consequently to the bristle clusters 25 mounted therein.

Surrounding the magnetostrictive stack 106 and the connecting member 707 is a generally cylindrical casing 110 formed of a suitable fluid impervious material which is secured thereto by means not shown. The end of the casing 110 is thickened and provided with a transverse slot 112 to engage a suitably provided pin in the handle section 104. At its opposite end, the casing 110 is provided with a small diameter shoulder 113 adapted to be engaged by the brush housing 114, which is generally cylindrical in cross-section and provied with an opening along its length to allow for protrusion of the bristle clusters 25. The enclosure 114 may be formed to firmly engage the reduced diameter shoulder 113 and be removed only when it is desired to replace the brush member 10, such as when the bristle clusters 25 have been worn to a point where they are no longer effective.

The handle element 104 consists of a tubular section 116 and an extension 117 which fits within the section 111, leaving between the members an annular space extending substantially over their entire lengths. Within the annular space is wound a coil 118 of insulated wire for establishing the magnetic field. At the rearward end of the above bore in the extension 117 is formed a reduced diameter portion 120 sized to snugly receive the brush insert 102. A similar portion 121 is provided at the forward end of the member 117 so that the insert 102 is firmly supported in the handle 104. A pin 122 provided on the casing 110 so that the insert 102 may be removed from the handle with the proper amount of force. The ends of the coil 118 are brought out through a conductor 125 and into a plug connector 126. The latter is provided with a pair of prongs 127 suitable for insertion in an appropriate source of electrical energy (not shown), capable of producing electrical oscillation in the high sonic or ultrasonic range of approximately 5,000 to 100,000 c.p.s. A thumb switch 128 may be provided on the exterior of the handle 104 for opening or closing the coil circuit to control the supply of power to the cleaning implement.

With further reference to FIGS. 2 and 3, it will be seen that the base portion 12 is comprised of a rear section 14 and a smaller forward section 15, both of which may have a rectangular cross-section and formed from a solid piece of material capable of supporting ultrasonic vibrations. The juncture of the two sections is provided with a radius 19 to permit the proper transmission of the high frequency vibrations without endangering the strength of the base of the brush as by creating critical stress concentrations. The change of cross-section from the rear section 14 to the forward section 15 acts as an acoustical impedance transformer to increase the amplitude of vibration and is more fully discussed in U.S. Patent No. Re. 25,033, assigned to the present assignee. The base section 12 is provided with a series of bristle receiving apertures 16 that may be formed of any desired cross sectional configuration, but as herein illustrated they are if a circular section and arranged in a particular pattern. The axes of the apertures 16 extend in a plane substantially normal to the face or front surface 17 of the base 12, the face in turn extending in a horizontal plane substantially parallel with the direction of longitudinal vibratory motion. The apertures 16 may extend through the base as shown in FIG. 3 or may be in the form of blind holes extending from the face surface 17 and terminating before the rear surface 18 of the base 12 is reached. As seen in FIG. 2 the series of apertures 16 are formed in two columns extending in parallel spaced relationship to each other with rows of apertures 16 being equidistantly spaced from each other.

As previously stated present brushes do not permit the proper transmission of the vibratory motion from the base member to the individual bristles of a bristle cluster for prolonged periods of time without fatiguing the bristle elements 26 that generally comprise the bristle clusters. In accordance with the present invention it was found that proper coupling means could be obtained by employing a bonding agent in the form of a generally hard epoxy resin material such as Epocast although not limited thereto, which transmits the vibratory motion induced in the base 12 by the driving member 103 to the bristle clusters 25.

Certain features of the invention can best be explained in terms of the diameter and length of the bristle elements 26 extending from the face surface 17 of the base portion 15 of the brush 10. FIG. 4 is a schematic illustration of a single bristle element 26 that is induced to vibrate in a plane substantially normal to its longitudinal axis, as indicated by double headed arrow 11, to set up a standing wave pattern within the bristle element so that flexural vibrations are induced in the tip or end portion 28. The brush is designed to have the tip 28 of the bristle elements 26 vibrating in a flexural mode to produce a scrubbing action against the surface of the teeth. As to the technology of the bristle motion we are dealing here with high frequency flexural vibrations of thin rods. The wavelength of the flexural wave in a particular bristle is given by the simple equation:

$$\tau_f = \sqrt{C\tau_0}$$ (bristles of circular cross section)

where $\tau_f$ = flexural wavelength at the frequency of operation of the dental cleaning implement
$C$ = circumference of the bristle element ($= \pi \times$ bristle dia.)
$\tau_0$ = wavelength of a longitudinal wave in the bristle material $$\tau_0 = \frac{C}{f}$$

$C$ = speed of sound in bristle material
$f$ = frequency of operation of the dental cleaning implement For example, at 25 kc./sec., suppose we take a .010″ diameter bristle element and assume a speed of sound of about $100 \times 10^3$ in./sec. in the bristle material. Then $$\tau_f = \frac{100\pi 10^{-2} \times 10^3}{25 \times 10^3} \simeq .36''$$

So the flexural wavelength is generally equal to or less than the length of the bristle at 25 kc./sec. This means that the average bristle element 26 is probably vibrating somewhat as illustrated in FIG. 4. An important aspect in the cleaning performed is generally the combined action of the cavitation action which is produced when the layer of fluid 132 in FIG. 1 is subjected to ultrasonic vibrations.

As illustrated in FIG. 5, which is an enlarged view illustrating the relationship between the bristle cluster 25, the coupling means 35 and aperture 16 as seen in FIG. 3, the bristle cluster 25 is seen to be comprised of a plurality of bristle elements 26 having a terminal end 27 and a free end 28 to engage various portions of the oral cavity. The bristle cluster 25 is shown angularly disposed with respect to the direction of vibration indicated by the double headed arrow 11, so that the flexural vibrations are induced in said bristle clusters. The extent to which the bristle cluster is sloped may vary and it has generally been found that an angle of from 90° to 45° with the extended line of vibratory motion is most satisfactory. The bristle elements 26 are embedded or cast within the bonding agent 36 to guarantee a sufficient coupling of the vibratory energy. A depth of insertion within the bonding agent of about .080 inch has been found satisfactory for bristles ranging in diameter from .008 to .012. It is essential that the bonding agent for coupling the vibrations in said base portion to said bristle elements substantially occupies the entire area defined by the apertures 16 to properly transmit the vibrations. As seen in FIG. 5 this is accomplished by the bonding agent entirely occupying the aperture 16 and firmly supporting the terminal ends 27 of the bristle cluster 25. The bonding agent 36 terminates substantially flush with the surface 17 of the base portion 15 from which the bristle cluster extends.

FIGURE 6 is essentially as shown in FIG. 5 except that the coupling means 35a consists of a bonding agent 36a in surrounding relationship to the bristle cluster 25a that terminates in a raised portion 38 which is substantially above the face surface 17a of said base portion 15a from which the bristle cluster extends. In the actual manufacture of the brushes in accordance with the present invention it has been found desirable for certain sizes and configurations to first join the terminal ends 27a of the bristle elements 26a prior to their insertion into their respective apertures 16a. As illustrated in FIG. 6 the terminal ends 27a of the bristle cluster 25a is formed into a head portion 39 of a single mass in a manner whereby the bristle cluster may be individually handled as a unit. Thus, a head 39 on the bristle cluster is provided for joining the bristle element at one end thereof so that a unitary structure is formed that permits ease in fabrication of the brush as well as additional insurance that the vibratory energy is properly coupled through the bonding agent 36a to each of the individual bristle elements 26a. It is appreciated that when the bonding agent substantially occupies the entire aperture 16a, a certain amount will penetrate and actually find its way between the individual bristles near the terminal end to simultaneously retain the bristle elements in place and transmit the vibratory energy thereto. There are various means for joining the terminal ends of the bristles and for example, a heat source may be employed to melt the bristles and form them into a solid joint. The physical depth by which the bristle cluster is embedded within the bonding agent will vary in accordance with the diameter and size of the bristle cluster as well as the number of bristles therein.

Although the bonding agent has been illustrated in FIGS. 5 and 6 as being substantially flush with or terminating in a raised portion with respect to the face surface of the brush base, it has been found that prolonged life of the bristle cluster may be substantially increased if the actual bonding agent in surrounding relation to the bristle cluster terminates in a pre-determined configuration as illustrated in FIG. 7.

As illustrated in FIG. 7, a preferred configuration is essentially one in which there is a depressed area 41 in surrounding relation to the terminal ends 27b of the bristle cluster 25b and between the aperture wall 16b. This depressed area is preferably below the front surface 17b of said base portion 15b and is one having a concave surface 42 terminating near the terminal ends 27b of the bristle elements 26b. Essentially this concave surface acts to minimize the stress concentration during the flexural movement of the free end 28b of the individual bristle elements 26b when the latter are in contact with either the teeth or gums in the user's oral cavity. The phantom lines in FIG. 7 illustrate how the contoured surface 42, which may have a definite radius, limits the movement of the bristle element 26b and it has been found that this radius or curvature tends to substantially increase the fatigue life of the individual bristles in the bristle cluster.

In this manner, again depending upon the number of bristles per bristle cluster, there will be a rim of bristle elements 26b which will continuously abut the depressed or contoured surface 42 during their entire operation. With respect to the inner bristles that are not in abutment with the contoured surface 42 they have the advantage of abutting an adjacent bristle that is in abutment with the surface and thereby guided with respect to the amount of its angular curvature. These inner bristles tend to ride against and move in unison with the outer bristles and essentially benefit in the same respect as the outer bristles although not in contact with a contoured surface. Accordingly the innermost bristles may be several bristles removed from the bristle in immediate engagement with the aperture wall 16b and still benefit by the contoured surface 42.

FIGS. 8 and 9 illustrate another embodiment of the invention wherein the brush 10d having a base 45 is shown to be of a generally rectangular shape and may be cast or machined from aluminum or other metallic material. A series of apertures 16d, extending substantially normal to the face surface 46, are provided for receiving a plurality of bristle clusters 25d. The input end 47 of the base 45 is provided with a threaded portion 21d for fastening the brush to the removable insert 102. The bristle clusters 25d of the present embodiment extend substantially perpendicularly to the direction of longitudinal vibration induced in said base portion so that flexural vibrations in accordance with FIG. 4 occur at the tips 28d of the individual bristle elements 26d.

As illustrated in FIG. 1, the brush insert is shown provided at its forward end with a brush housing 114 and although the housing generally acts to insulate the base 45 from contact with the teeth or gum surfaces of the user, it has been found desirable to provide acoustically insulating means 50 on the base of the brush so that the brush may be used with or without the housing. For example, if the housing was to become loosened during usage and even momentarily engaged the brush base which is being vibrated at ultrasonic frequencies, there would be resulting noise that might be objectionable, as well as transmitted to the user unless the base is acoustically insulated. Additionally, by providing acoustical insulating means on the brush base it tends to minimize either any cavitational or other noise that might be noted from the operational use of the ultrasonic toothbrush. It has been found preferable to cover substantially the entire base with a layer of material 50 as for example, foam or sponge rubber or other poor transmitter of vibratory energy, of a thickness generally in the range of $\frac{1}{16}$ to $\frac{1}{4}$ of an inch.

The acoustical insulating material 50 serves the additional purpose in that if the base of 45 of the brush 10d becomes heated due to losses within the transmission material the insulating material remains relatively cool, and no objectionable heat is transmitted to the user. This feature is also important in that the ultrasonic toothbrush, depending on its design and construction, may not be utilized with a brush housing.

To permit the individual user to recognize his own readily replaceable brush it has been found desirable to color code each one and this is accomplished best by providing a layer of material 51 that presents a smooth textured surface as it adheres to the acoustically insulated material 50. Thus as illustrated in FIGS. 8 and 9 we have an embodiment of the invention that may be secured to an ultrasonic motor for use in a dental operation, and wherein the entire brush head is acoustically insulated to minimize the transmission of sound or other objectionable noise when the free ends 28d engage the tooth or gums of the user and simultaneously any heat that develops in the base is maintained substantially therein without it being transmitted to the oval cavity of the user.

A preferred form of brush which will accomplish the objectives of the present invention as illustrated in FIGS. 8 and 9 may be one having a base 45 made of aluminum of a length of .93 inch, a width of .312 inch and a thickness of .18 inch in the plane normal to the vibrations. In a base so dimensioned a series of .047 diameter apertures 16d may be accommodated with each aperture containing 10 nylon filament bristles 25d, such as Herox, of .012 diameter per bristle. The depth of the apertures extend through the base and the bristle elements extend substantially therethrough and are coupled to the base by a bonding agent such as Epocast. The length of the bristle clusters are approximately .40 inch from the face 46 of the base 45. The acoustically insulated coating 50 is .06 inch thick and of sponge rubber with a .06 inch coating 51 of a smooth thermoplastic material covering it.

FIGURE 10 illustrates the position of the brush 10e with respect to the teeth 130 and gingival tissue 131 during the conventional cleaning operation. As will be expected at various times several of the bristle clusters 25e will contact either the teeth and/or gingival tissue. As indicated hereinabove the response of the bristle element to the exciting frequency will vary greatly with the bristle length. For this reason it is preferable to use bristle clusters comprising a range of bristle elements 26e of different lengths.

Since it is desirable to transmit a sufficient quantity of vibratory energy from the bristle tips 28e it has been found that bristle clusters made up of various length bristle elements permits the bristle tips 28e to engage the teeth surfaces interproximally thereto so as to further enhance the beneficial results obtainable by the use of the ultrasonic dental cleaning implement. This will lead to better over-all bristle cluster vibration and is illustrated in FIG. 10.

FIGS. 11 and 12 illustrate another embodiment of the invention wherein the brush 10f contains a series of bristle clusters 25f in combination with a stimudent 53 to further enhance the beneficial effects of the dental cleaning implement. As seen in FIG. 11 the brush consists of a base 54 having a cylindrical configuration and being provided at one end 55 with a series of apertures 16f which penetrate a certain distance into the base 54 and said apertures being arranged to form a circular ring as seen in FIG. 11. The stimudent 53 which may be of material capable of supporting vibrations such as plastic is embedded within recess 56 provided in the base 54 and may be secured thereto by a bonding agent in accordance with the procedures discussed in FIGS. 5–7, inclusive, or any additional means if desired. The length of the bristle clusters 25f are selected so that the free ends of the bristle elements 28f, which form an enclosure, are closely spaced with respect to the bottom 57 of the stimudent 53. This interrelationship essentially creates a chamber within which a supply of fluid 132, which may be a powder dentifrice mixed with water or some other form of dentrifrice, is simultaneously subjected to the random motion of the bristle tips 28f and the high frequency vibratory motion of the end of the stimudent 53. Essentially, a layer of material is provided which is cavitated in the generally well known fashion to aid in cleansing and removing the particles from between the teeth or those physically adhered to the teeth surface. The vibratory motion may be coupled to the cleaning implement by providing a threaded member 21f which is rigidly secured as by welding or some other means to said base.

In accordance with FIGS. 11 and 12 a brush having a base with an outer diameter of .50 inch and a series of 12 bristle clusters 25f spaced on a .375 diameter, each having an aperture 16f, .062 inch in diameter for accommodating .187 inch within the base, has provided desirable results. The stimudent 53 is of a thermoplastic material having a .250 inch diameter. The bristle free ends 28f extend past the front 57 of the stimudent by about .062 inch to create the desired chamber.

FIGURES 13 and 14 illustrate another embodiment of the invention in which the vibratory motion as indicated by the double headed arrow 11 is transmitted to the brush 10g along a plane substantially parallel to the direction of the bristle clusters 25g secured thereto as previously explained. The threaded portion 21g of the brush 10g may engage the connecting body 107 of the toothbrush 100 in which case the brush housing may be dispensed with or the housing may be formed to be adaptable for substantially enclosing the brush 10g.

The ultrasonic toothbrush 100 hereinabove illustrated is one preferred embodiment that may be employed with the brushes 10 of the present invention. It will be appreciated by those skilled in the art that other hand held devices might be employed to drive the brushes of the present invention at ultrasonic frequencies. Although the brushes of the present invention are generally illustrated as being secured to the ultrasonic motor by fastening means, it is appreciated that, depending on the type of construction utilized, for example, if the brush was made an integral part of the brush insert, then the need for the fastening means would be eliminated and then the entire brush insert with the brush would become readily replaceable as a unit. But, in view of the general cost of the driving member of the brush insert, it is generally desirable that the brush be of a readily replaceable design as herein illustrated. Additionally, the ultrasonic motor driving member and handle of the cleaning implement are integral with each other so that the brush is readily replacable with respect to the entire motor construction.

While certain novel features of this invention have been disclosed herein and are pointed out in the claims, it will be understood that various omissions, substitutions, and changes may be made by those skilled in the art, without departing from the teachings of the invention.

What is claimed is:
1. A readily replaceable brush for use with an ultrasonic driving member in a dental implement comprising:
   (A) a plurality of bristle clusters,
   (B) a base portion capable of supporting ultrasonic vibrations and adapted to be set into vibration in a given direction at ultrasonic frequencies by the driving member, said base portion being provided with a series of apertures for respectively receiving an end of each of said bristle clusters,
   (C) means to control the movement of the bristles at the base portion to prevent the development of excessive stress concentrations, and
   (D) means for coupling the vibrations induced in said base portion to said bristle clusters, said coupling means comprised of a bonding agent capable of supporting ultrasonic vibrations for firmly securing the ends of the bristle clusters to the base portion, whereby ultrasonic vibratory motion is imparted to the bristle clusters.

2. A readily replaceable brush as in claim 1, wherein the bonding agent in surrounding relation to the bristle cluster forms a recessed area, said area being below the surface of said base portion.

3. A readily replaceable brush as in claim 1, wherein the bonding agent between said bristle cluster and aperture is formed having a contoured surface, said contoured surface being concave in form.

4. A readily replaceable brush as in claim 1, wherein the bonding agent terminates substantially flush with the surface of said base portion from which the bristle cluster extends.

5. A readily replaceable brush as in claim 1, wherein the bonding agent in surrounding relationship to said bristle cluster terminates in a raised portion, said raised portion being substantially above the surface of said base portion from which the bristle cluster extends.

6. A readily replaceable brush as in claim 1, wherein said base is of a metallic material.

7. A readily replaceable brush as in claim 1, further comprising means for acoustically insulating the base of said brush whereby the vibratory motion remains isolated therein and is not transmitted to the oral cavity.

8. A readily replaceable brush as in claim 7, wherein said means for acoustically insulating the base of said brush comprises a layer of vibration absorbent material which substantially covers the entire base.

9. A readily replaceable brush as in claim 8, wherein said vibration absorbent material is substantially covered with a layer of material that presents a smooth textured surface.

10. A readily replaceable brush as in claim 1, wherein said bristle clusters are angularly disposed with respect to the direction of vibration in said base portion so that flexural vibrations are induced in said bristle clusters.

11. A readily replaceable brush as in claim 10, wherein said bristle clusters are disposed in a plane substantially perpendicular to the direction of vibration.

12. A readily replaceable brush as in claim 1, wherein said bristle clusters are disposed in a plane substantially parallel to the direction of vibration induced in said base portion.

13. A readily replaceable brush as in claim 1, wherein said bristle clusters are comprised of a plurality of bristle elements.

14. A readily replaceable brush as in claim 13, wherein the bristle elements of the bristle cluster are of various lengths.

15. A readily replaceable brush as in claim 13, further comprising means for joining the bristle elements forming said bristle clusters at one end thereof.

16. A readily replaceable brush as in claim 13, wherein at the frequency of vibration the bristle elements are of a length and diameter calculated to vibrate flexurally for transmission of vibratory energy at a level sufficient to cavitate a fluid film on the tooth surfaces.

17. A readily replaceable brush as in claim 13, wherein the length of said bristle element is substantially equal to a wavelength of the frequency of vibration imparted thereto.

18. A readily replaceable brush as in claim 13, wherein said bristle elements extending from said base are of a length in the range of from substantially .30 inch to .60 inch; and
wherein said bristle elements are of a diameter in the range of substantially from .006 inch to .016 inch.

19. A readily replaceable brush as in claim 1, further comprising means for securing said base to the driving member, said securing means including a threadably engageable portion adapted to mate with a complementary threadably engageable portion of the driving member.

20. A readily replaceable brush as in claim 1, wherein said bristle clusters are arranged to form a circular ring, and
further comprising a stimudent positioned within said ring and extending from said base.

21. A readily replaceable brush as in claim 19, wherein the free end of the bristle clusters extend past the end of the stimudent to define a chamber for the fluid to be retained therein and subjected to high frequency vibrations.

References Cited
UNITED STATES PATENTS

| | | | |
|---|---|---|---|
| 1,992,770 | 3/1935 | Rathbun | 15—22 X |
| 2,488,873 | 11/1949 | Maynard | 15—167 X |
| 2,845,649 | 8/1958 | Hutson | 15—167 |

FOREIGN PATENTS

| | | |
|---|---|---|
| 700,065 | 12/1930 | France. |

CHARLES A. WILLMUTH, *Primary Examiner.*

E. L. ROBERTS, *Assistant Examiner.*

UNITED STATES PATENT OFFICE

CERTIFICATE OF CORRECTION

Patent No. 3,335,443                          August 15, 1967

Tulio Parisi et al.

It is hereby certified that error appears in the above numbered patent requiring correction and that the said Letters Patent should read as corrected below.

Column 5, line 4, for "707" read -- 107 --; line 12, for "provied" read -- provided --; column 12, line 12, for the claim reference numeral "19" read -- 20 --.

Signed and sealed this 20th day of August 1968.

(SEAL)
Attest:

Edward M. Fletcher, Jr.                      EDWARD J. BRENNER
Attesting Officer                             Commissioner of Patents